Sept. 2, 1924.

A. MAAKE 1,507,077

WINDOW FOR MOTOR DRIVEN VEHICLES

Filed June 29, 1922

Inventor
Arthur Maake

By S. E. Thomas
Attorney

Patented Sept. 2, 1924.

1,507,077

UNITED STATES PATENT OFFICE.

ARTHUR MAAKE, OF DETROIT, MICHIGAN.

WINDOW FOR MOTOR-DRIVEN VEHICLES.

Application filed June 29, 1922. Serial No. 571,732.

*To all whom it may concern:*

Be it known that I, ARTHUR MAAKE, a citizen of the United States, residing at Detroit, county of Wayne, State of Michigan, have invented a certain new and useful Improvement in Windows for Motor-Driven Vehicles, and declare the following to be a full, clear, and exact description of the same, such as will enable others skilled in the art to which it pertains to make and use the same, reference being had to the accompanying drawings, which form a part of this specification.

My invention relates to windows for motor driven vehicles and more particularly the side curtains thereof.

The principal object of the present invention is to provide simple and inexpensive means whereby sheet glass may be mounted in the usual window openings of this type of curtain.

A further object is to provide means for supporting the glass in the curtain, whereby it is not apt to become separated therefrom through the vibration of the vehicle.

One feature of the invention includes a cardboard frame of suitable size and thickness mounted in the window openings, between the body of the curtain and its lining, to which it is sewed or otherwise secured.

The marginal edge of the glass is cemented to the inner marginal edge of the cardboard frame and the frame is reenforced by a plurality of wooden strips surrounding the glass and overlapping the cardboard frame.

The strips are covered by the lining and are held against displacement by a line of stitches extending through the curtain, cardboard frame and lining between the strips and edge of glass, and also through the cardboard frame and lining adjacent the opposite edge of the wooden strips,—the purpose of the strips are to stiffen the cardboard frame, and to prevent it from buckling or cracking under pressure.

With the foregoing and other objects in view which will appear as the description proceeds the invention further resides in the combination and arrangement of the parts and in the details of construction hereinafter described and claimed, it being understood that changes may be made in the precise embodiment of the invention shown by the drawings without departing from the spirit of the same.

In the drawings accompanying this specification:

Figure 1:
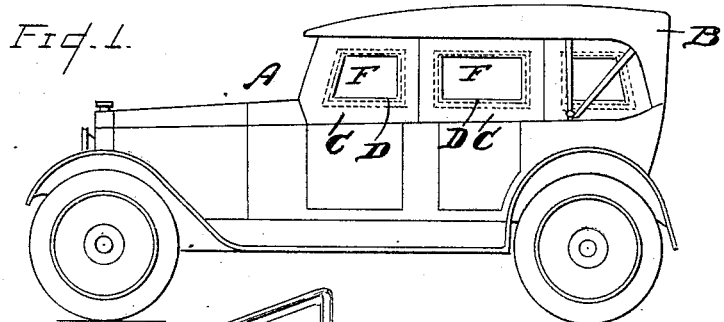
Figure 1 is a side elevation of an automobile fitted with a top having side curtains in which the invention is installed.
Figure 3:
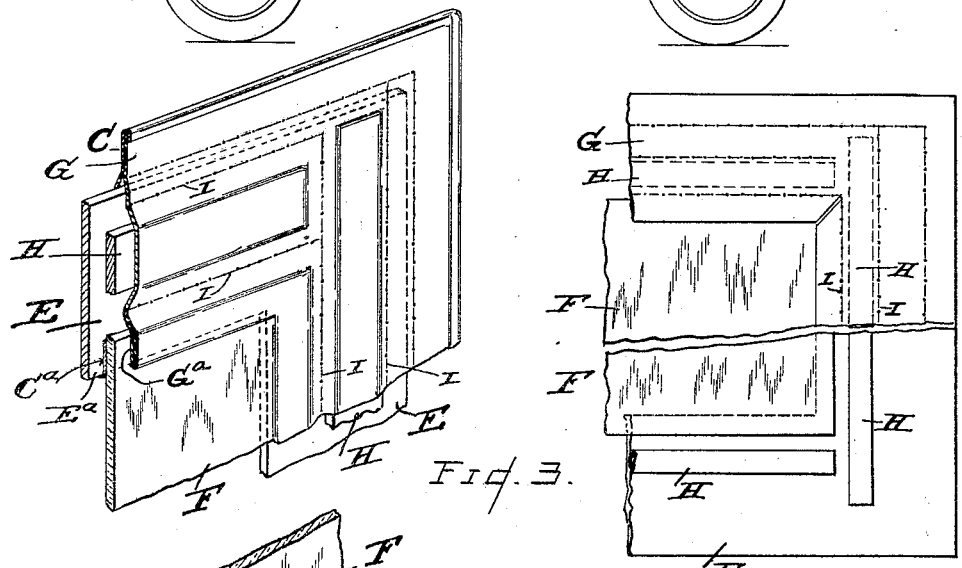
Figure 3 is a fragmentary perspective view of one corner of the curtain showing the window frame, glass and reinforcing strips.
Figure 2:
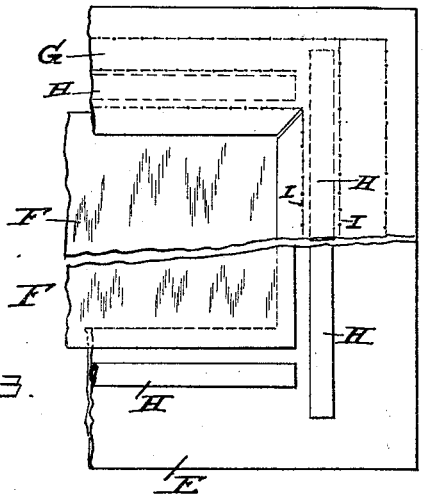
Figure 2 is a fragmentary elevation of the inside of the curtain with a portion of the lining removed to disclose the window frame and the reinforcing strips overlapping the frame.
Figure 4:
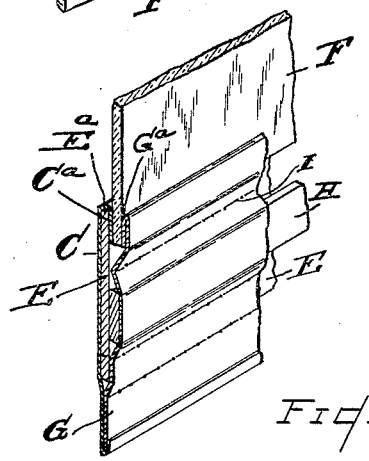
Figure 4 is a fragmentary perspective view showing the marginal edge of the curtain overlapping the marginal edge of the window frame, with the marginal edge of the glass projecting between the latter and the marginal edge of the lining which is folded back upon itself.

Referring now to the letters of reference placed upon the drawings:—

A, indicates an automobile, B its top and C its side curtains provided with the usual window openings D. E, designates a supporting frame for a sheet of glass F. The frame is constructed of cardboard of suitable size and thickness and is lodged between the body of the curtain C and its lining G. The marginal edge $C^a$ of the curtain surrounding the window is bent to overlap the inner marginal edge $E^a$ of the frame, to which it is cemented or glued. Surrounding the glass F and spaced therefrom are a plurality of wood strips H, overlapping the cardboard frame, and covered by the lining. I, indicates a line of stitching on each side of the wood strips extending through the curtain, its lining and the cardboard frame to secure the wooden strips or reinforcing members against displacement. The marginal edge $G^a$ of the lining surrounding the opening is bent back upon itself and the marginal edge of the glass F extends between the curtain C and the lining G to which it is cemented or glued.

Suitable grummets—not shown—are provided in the curtain for securing it to the frame and vehicle top in the usual manner. It will be apparent that the cardboard frame provides a light, simple and inexpensive support for the glass and that the wood strips afford ample rigidity and serve to protect the frame against bending, buckling, or cracking under the strain to which curtains of this character are exposed. In the event of the glass being broken however from any cause it may be readily replaced at a trifling cost.

Having thus described my invention what I claim is:

1. In a device of the character described, the combination of a curtain provided with a window opening, a lining for the curtain, a frame constructed of paste board or the like fitted between the curtain and lining, with the marginal edge of the curtain overlapping the inner marginal edge of said frame, a sheet of glass fitted to the frame and cemented between the marginal edges of the curtain and lining, a plurality of wooden strips adjacent to and overlapping the body of the frame and covered by said lining, and a plural number of lines of stitches extending through the lining, frame and curtain on each side of said wooden strips to secure the wooden strips against displacement.

2. In a device of the character described, the combination of a curtain provided with a window opening, a lining for the curtain, a frame attached to the curtain and having its inner edge covered thereby, a reinforcing strip between the curtain and lining, the said lining being stitched to the frame and curtain adjacent the window opening to form a pocket for the said reinforcing strip and providing free inner edges, and a window panel having its marginal edge secured to and between the free edges of the lining and curtain.

In testimony whereof, I sign this specification in the presence of two witnesses.

ARTHUR MAAKE.

Witnesses:
S. E. THOMAS,
JOHN CONSIDINE.